US012669324B2

(12) United States Patent
Gorey et al.

(10) Patent No.: US 12,669,324 B2
(45) Date of Patent: Jun. 30, 2026

(54) NON-DESTRUCTIVE ESTIMATION OF COATING LAYER THICKNESS BASED ON SWEEP FREQUENCY PHOTO ACOUSTIC GUIDED WAVE TECHNIQUE

(71) Applicant: Tata Consultancy Services Limited, Mumbai (IN)

(72) Inventors: Abhijeet Gorey, Kolkata (IN); Arpan Pal, Kolkata (IN); Subhadeep Basu, Kolkata (IN); Chirabrata Bhaumik, Kolkata (IN); Annesha Mazumder, Kolkata (IN); Tapas Chakravarty, Kolkata (IN); Arijit Sinharay, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 299 days.

(21) Appl. No.: 18/494,071

(22) Filed: Oct. 25, 2023

(65) Prior Publication Data

US 2024/0151515 A1 May 9, 2024

(30) Foreign Application Priority Data

Nov. 7, 2022 (IN) .............................. 202221063431

(51) Int. Cl.
*G01B 11/06* (2006.01)
*G01B 17/02* (2006.01)
(Continued)

(52) U.S. Cl.
CPC ...... *G01B 11/0666* (2013.01); *G01B 11/0616* (2013.01); *G01B 17/025* (2013.01); (Continued)

(58) Field of Classification Search
CPC .............. G01B 11/0666; G01B 17/025; G01B 11/0616; G01N 2291/02854; (Continued)

(56) References Cited

U.S. PATENT DOCUMENTS

| | | | | |
|---|---|---|---|---|
| 5,194,723 A | * | 3/1993 | Cates | ................. G01N 29/2418 |
| | | | | 219/121.62 |
| 7,798,000 B1 | * | 9/2010 | Murray | .............. G01N 29/2418 |
| | | | | 73/579 |

(Continued)

FOREIGN PATENT DOCUMENTS

| | | | | | |
|---|---|---|---|---|---|
| CN | 107830810 A | * | 3/2018 | ......... | G01B 11/0616 |
| CN | 114638451 A | | 6/2022 | | |

(Continued)

OTHER PUBLICATIONS

Translation_CN107830810 (Year: 2018).*

*Primary Examiner* — Peter J Macchiarolo
*Assistant Examiner* — Monica S Young
(74) *Attorney, Agent, or Firm* — Finnegan, Henderson, Farabow, Garrett & Dunner, LLP

(57) ABSTRACT

This disclosure relates to non-destructive estimation of coating layer thickness based on sweep frequency photo acoustic guided wave technique. Coating of a substrate/ surface protects it from wear, corrosion and serves the cosmetic aspect, hence making coating technology is an essential part industrial process. The existing techniques for coating thickness determination are either destructive or requires a prior knowledge of the refractive index of the surface under investigation or use of sophisticated instrumentation, complicated procedure and harmful radiation during industrial deployment. The disclosure utilizes an intensity modulated Continuous Wave (CW) laser diode to excite a sample thus, making the technique a partially contact based method. Further a calibration curve is plotted (Continued)

by determining a frequency spectrum and resonance frequency. The calibration curve is used for estimation of a coating layer thickness.

15 Claims, 8 Drawing Sheets

(51) Int. Cl.
| | |
|---|---|
| *G01N 29/12* | (2006.01) |
| *G01N 29/22* | (2006.01) |
| *G01N 29/24* | (2006.01) |
| *G01N 29/44* | (2006.01) |

(52) U.S. Cl.
CPC ........... *G01N 29/12* (2013.01); *G01N 29/223* (2013.01); *G01N 29/2418* (2013.01); *G01N 29/4436* (2013.01); *G01N 2291/0231* (2013.01); *G01N 2291/02854* (2013.01)

(58) Field of Classification Search
CPC ....... G01N 2291/0231; G01N 29/4436; G01N 29/2418; G01N 29/223; G01N 29/12
USPC .......................................................... 73/649
See application file for complete search history.

(56) References Cited

U.S. PATENT DOCUMENTS

| | | | | |
|---|---|---|---|---|
| 2002/0107650 A1* | 8/2002 | Wack | ...................... | G01N 21/47 702/81 |
| 2008/0291456 A1* | 11/2008 | Ghislain | .............. | G01N 29/032 356/450 |
| 2009/0222238 A1* | 9/2009 | Gagnon | ............. | G01B 11/0625 702/172 |
| 2012/0186352 A1* | 7/2012 | Wynn | ................ | G01N 21/1702 73/655 |
| 2015/0233870 A1* | 8/2015 | Prinzhorn | ........... | G01B 17/025 73/643 |
| 2016/0051171 A1* | 2/2016 | Pikov | ................... | A61B 5/0507 600/407 |
| 2016/0148233 A1 | 5/2016 | Dangaltchev et al. | | |
| 2020/0326312 A1* | 10/2020 | Sinha | ..................... | G01N 33/49 |
| 2021/0365976 A1 | 11/2021 | Johnson et al. | | |
| 2022/0133273 A1* | 5/2022 | Dangi | ................. | A61B 5/0095 600/459 |

FOREIGN PATENT DOCUMENTS

| | | | | |
|---|---|---|---|---|
| EP | 1679513 A2 * | 7/2006 | ........ | G01N 29/2418 |
| WO | WO-2007140943 A1 * | 12/2007 | ........ | H03H 9/02102 |
| WO | WO2018232463 A1 | 12/2018 | | |

* cited by examiner

100

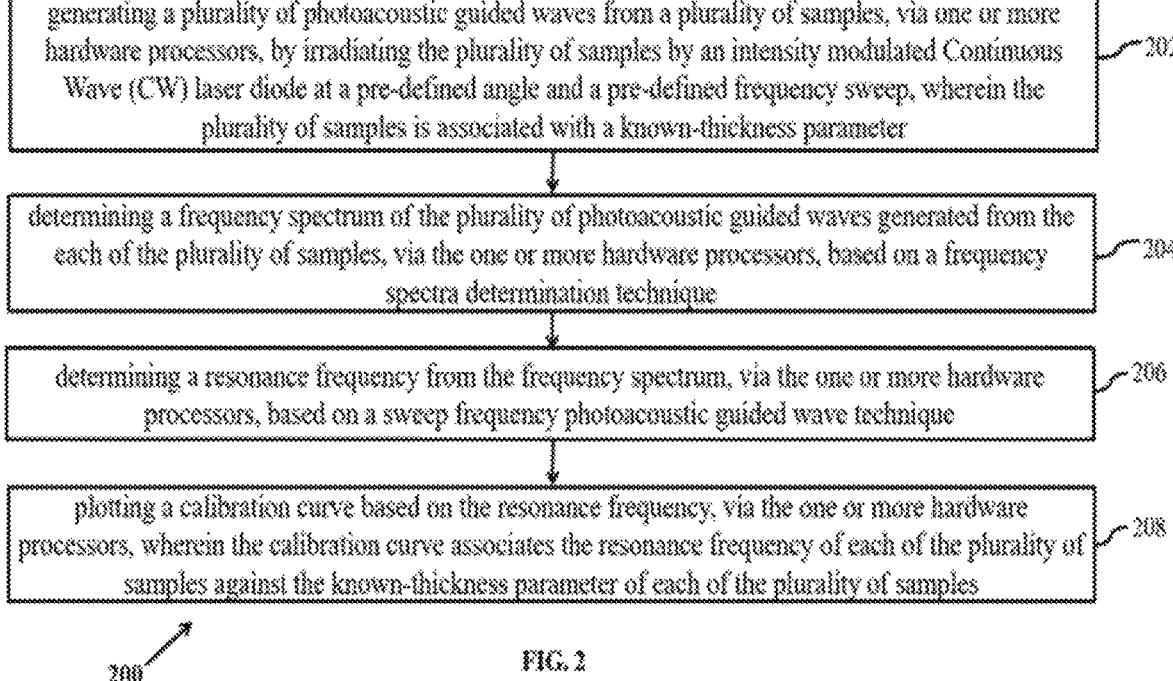

generating a plurality of photoacoustic guided waves from a plurality of samples, via one or more hardware processors, by irradiating the plurality of samples by an intensity modulated Continuous Wave (CW) laser diode at a pre-defined angle and a pre-defined frequency sweep, wherein the plurality of samples is associated with a known-thickness parameter ⟋202 determining a frequency spectrum of the plurality of photoacoustic guided waves generated from the each of the plurality of samples, via the one or more hardware processors, based on a frequency spectra determination technique ⟋204 determining a resonance frequency from the frequency spectrum, via the one or more hardware processors, based on a sweep frequency photoacoustic guided wave technique ⟋206 plotting a calibration curve based on the resonance frequency, via the one or more hardware processors, wherein the calibration curve associates the resonance frequency of each of the plurality of samples against the known-thickness parameter of each of the plurality of samples ⟋208

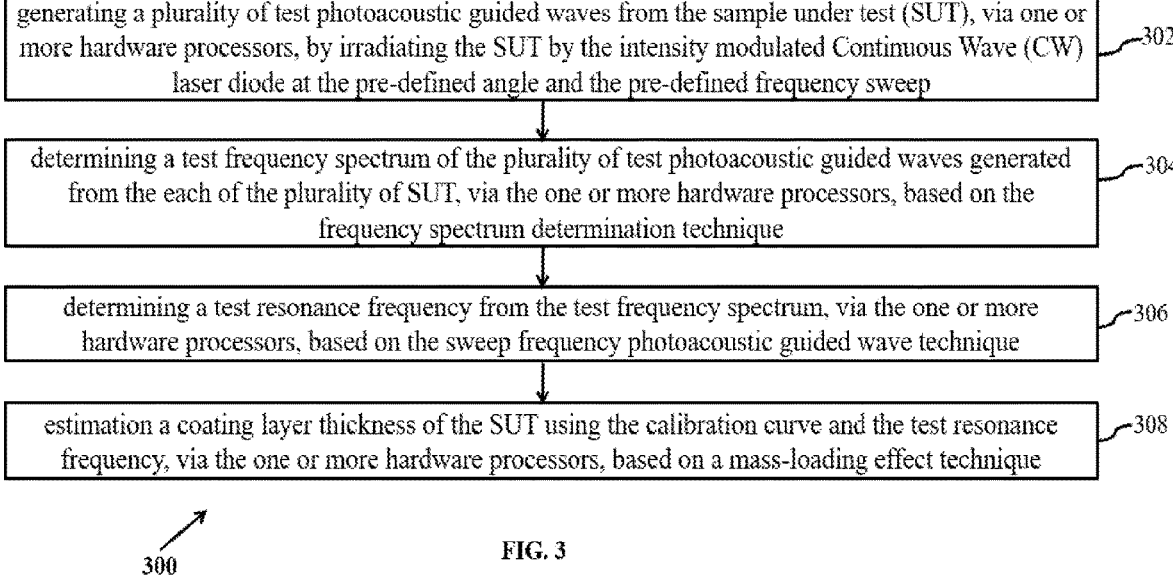

generating a plurality of test photoacoustic guided waves from the sample under test (SUT), via one or more hardware processors, by irradiating the SUT by the intensity modulated Continuous Wave (CW) laser diode at the pre-defined angle and the pre-defined frequency sweep — 302 determining a test frequency spectrum of the plurality of test photoacoustic guided waves generated from the each of the plurality of SUT, via the one or more hardware processors, based on the frequency spectrum determination technique — 304 determining a test resonance frequency from the test frequency spectrum, via the one or more hardware processors, based on the sweep frequency photoacoustic guided wave technique — 306 estimation a coating layer thickness of the SUT using the calibration curve and the test resonance frequency, via the one or more hardware processors, based on a mass-loading effect technique — 308

Alumin um

Alumin um + Primer- L4

500

Aluminum + Primer-L4

700

NON-DESTRUCTIVE ESTIMATION OF COATING LAYER THICKNESS BASED ON SWEEP FREQUENCY PHOTO ACOUSTIC GUIDED WAVE TECHNIQUE

PRIORITY CLAIM

This U.S. patent application claims priority under 35 U.S.C. § 119 to: Indian Patent Application No. 202221063431, filed on Nov. 7, 2022. The entire contents of the aforementioned application are incorporated herein by reference.

TECHNICAL FIELD

The disclosure herein generally relates to non-destructive estimation of coating layer thickness and, more particularly, to non-destructive estimation of coating layer thickness based on sweep frequency photo acoustic guided wave technique.

BACKGROUND

Coating is the process of covering a surface or substrate with another substance to protect it temporarily or permanently from deterioration or degradation. The coating of a substrate protects it from wear, corrosion, and also serves the cosmetic aspect, hence making coating technology an essential part industrial process. Since the coating impacts the overall performance of the substrate, the thickness of the coating is required to be optimum for the substrate. Further, uniformity of coating of paint is also necessary for establishing aesthetic value, in the absence of which problems such as blistering, blooming, and sagging can occur.

Traditionally practiced methods for thickness estimation includes gravimetric mass measurement or cross-sectional microscopy. The traditional methods are destructive and substrate specific with limited sampling resolution, thus making it difficult to use in fast paced industrial environments.

The existing techniques for non-destructive coating thickness determination are based on ultrasound and eddy current which involve contact measurement, making them unsuitable for large-scale industrial applications especially in online measurement. Other techniques for non-destructive coating thickness determination include beta backscatter measuring method, X-Ray fluorescence, THz time-domain spectroscopy and flash pulse phase thermography that require a prior knowledge of the refractive index of the surface under investigation, thus making them unsuitable for unknown samples. Further, the use of sophisticated instrumentation, complicated procedure and harmful radiation set up a challenge for industrial deployment. Hence there is a requirement for a non-destructive coating thickness determination technique with a high precision determination of thickness that works for a variety of paint films and substrates and can be deployed easily in fast paced industrial environments.

SUMMARY

Embodiments of the present disclosure present technological improvements as solutions to one or more of the above-mentioned technical problems recognized by the inventors in conventional systems. For example, in one embodiment, a system for non-destructive estimation of coating layer thickness based on sweep frequency photo acoustic guided wave technique is provided.

The system includes a memory storing instructions, one or more communication interfaces, and one or more hardware processors coupled to the memory via the one or more communication interfaces, wherein the one or more hardware processors are configured by the instructions to generate a plurality of photoacoustic guided waves from a plurality of samples, via one or more hardware processors, by irradiating the plurality of samples by an intensity modulated Continuous Wave (CW) laser diode at a pre-defined angle and a pre-defined sweep frequency, wherein the plurality of samples is associated with a known-thickness parameter. The system is further configured to determine a frequency spectrum of the plurality of photoacoustic guided waves generated from the each of the plurality of samples, via the one or more hardware processors, based on a frequency spectra determination technique. The system is further configured to determine a resonance frequency from the frequency spectrum, via the one or more hardware processors, based on a sweep frequency photoacoustic guided wave technique. The system is further configured to plot a calibration curve based on the resonance frequency, via the one or more hardware processors, wherein calibration curve associates the resonance frequency of each of the plurality of samples associated with the known-thickness parameter of each of the plurality of samples.

In another aspect, a method for non-destructive estimation of coating layer thickness based on sweep frequency photo acoustic guided wave technique is provided. The method includes generating a plurality of photoacoustic guided waves from a plurality of samples by irradiating the plurality of samples by an intensity modulated Continuous Wave (CW) laser diode at a pre-defined angle and a pre-defined sweep frequency, wherein the plurality of samples is associated with a known-thickness parameter. The method is further configured for determining a frequency spectrum of the plurality of photoacoustic guided waves generated from the each of the plurality of samples based on a frequency spectra determination technique. The method is further configured for determining a resonance frequency from the frequency spectrum based on a sweep frequency photoacoustic guided wave technique. The method is further configured for plotting a calibration curve based on the resonance frequency wherein the calibration curve associates the resonance frequency of each of the plurality of samples associated with the known-thickness parameter of each of the plurality of samples.

In yet another aspect, a non-transitory computer readable medium for non-destructive estimation of coating layer thickness based on sweep frequency photo acoustic guided wave technique. The method includes generating a plurality of photoacoustic guided waves from a plurality of samples by irradiating the plurality of samples by an intensity modulated Continuous Wave (CW) laser diode at a pre-defined angle and a pre-defined sweep frequency, wherein the plurality of samples is associated with a known-thickness parameter. The method is further configured for determining a frequency spectrum of the plurality of photoacoustic guided waves generated from the each of the plurality of samples based on a frequency spectra determination technique. The method is further configured for determining a resonance frequency from the frequency spectrum based on a sweep frequency photoacoustic guided wave technique. The method is further configured for plotting a calibration curve based on the resonance frequency wherein the calibration curve associates the resonance frequency of each of the plurality of samples associated with the known-thickness parameter of each of the plurality of samples.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram illustrating a method (200) for non-destructive estimation of coating layer thickness based on sweep frequency photo acoustic guided wave technique in accordance with some embodiments of the present disclosure.

FIG. 3 is a flow diagram illustrating a method (300) for non-destructive estimation of coating layer thickness based on sweep frequency photo acoustic guided wave technique for a sample under test (SUT) in accordance with some embodiments of the present disclosure.

DETAILED DESCRIPTION

Figure 1A:
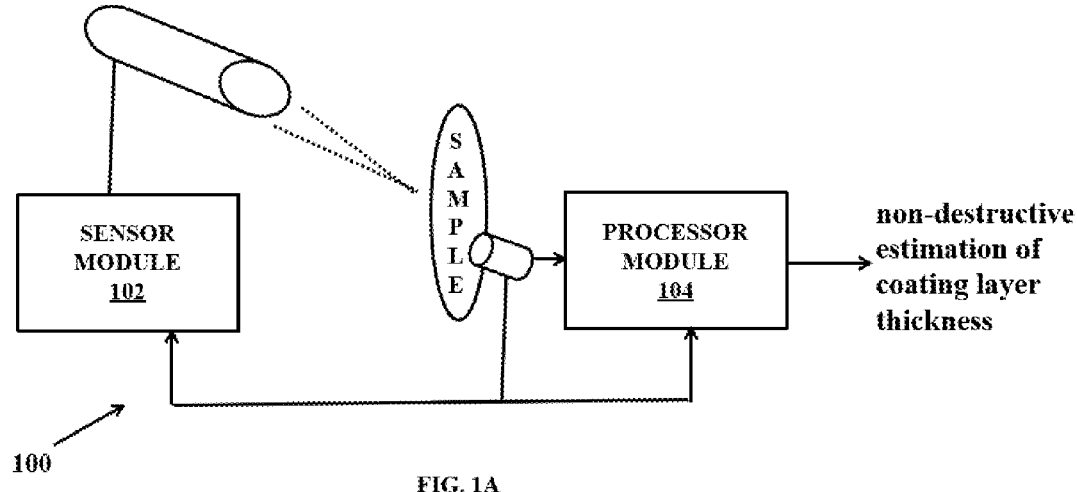
FIG. 1A illustrates an exemplary system for non-destructive estimation of coating layer thickness based on sweep frequency photo acoustic guided wave technique according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1A is an exemplary block diagram of a system 100 for non-destructive estimation of coating layer thickness based on sweep frequency photo acoustic guided wave technique in accordance with some embodiments of the present disclosure. In an embodiment, the system 100 includes a sensor module 102 and an analysis module 104.

The sensor module 102 is configured to generate a plurality of photoacoustic guided waves from a plurality of samples. The sensor module 102 includes an intensity modulated continuous wave (CW) laser diode and an ultrasound sensor. Further the analysis module 104 comprises a processor(s), communication interface device(s), alternatively referred as input/output (I/O) interface(s), and one or more data storage devices or a memory operatively coupled to the processor(s). The processor in the processor module 104 is configured to (a) determine a frequency spectrum from the plurality of photoacoustic guided waves, (b) determine a resonance frequency from the frequency spectrum, (c) to plot a calibration curve and (d) estimate a coating layer thickness using the calibration curve.

The plurality of photoacoustic guided waves is generated by irradiating the plurality of samples by the intensity modulated Continuous Wave (CW) laser diode at a predefined angle and a pre-defined sweep frequency, wherein the plurality of samples is associated with a known-thickness parameter. In an embodiment, the intensity modulated continuous wave (CW) laser diode of wavelength 808 nm to irradiate the sample. The in-house developed Laser Driver Module (LDM) is used to modulate the intensity of the laser diode with the sweep frequency of 100 kHz to 300 kHz. The sample absorbs the laser radiation and produces acoustic waves which are acquired by the ultrasound sensor kept in contact with the sample via a coupling medium. Subsequently, the acoustic signal from the ultrasound sensor is recorded by a Vector Network Analyzer (VNA, Bode-100) and stored into the memory and processor for further analysis.

Figure 1B:
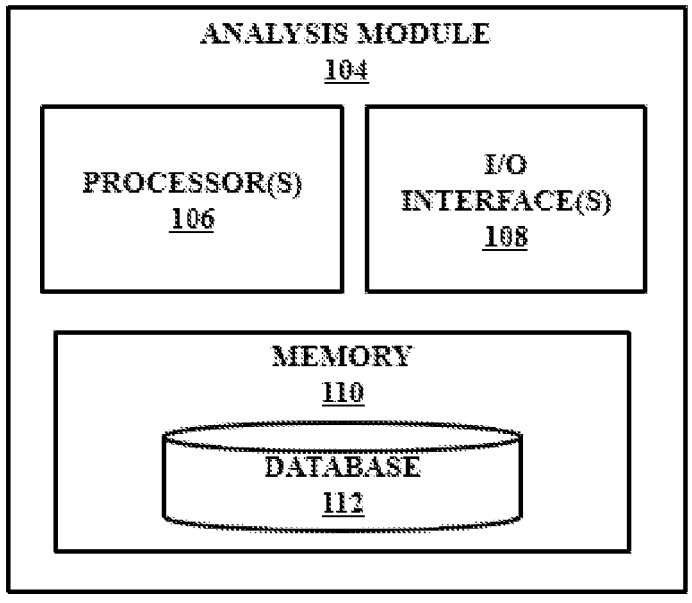
FIG. 1B illustrates an analysis module of the exemplary system of FIG. 1A during non-destructive estimation of coating layer thickness based on sweep frequency photo acoustic guided wave technique according to some embodiments of the present disclosure.

In an embodiment, the analysis module 104 comprise a processor(s) (106), an Input/Output interface(s) (108), memory (110) and a database (112) as shown in FIG. 1B. The processor (106) can be one or more hardware processors. In a preferred embodiment, the one or more hardware processors can be implemented as one or more microprocessors, microcomputers, microcontrollers, digital signal processors, central processing units, state machines, logic circuitries, and/or any devices that manipulate signals based on operational instructions. Among other capabilities, the one or more hardware processors is configured to fetch and execute computer-readable instructions stored in the memory. In an embodiment, the system 100 can be implemented in a variety of computing systems including laptop computers, notebooks, hand-held devices such as mobile phones, workstations, mainframe computers, servers, a network cloud and the like.

The Input/Output (I/O) interface(s) (108) can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s)

can include one or more ports for connecting a number of devices (nodes) of the system 100 to one another or to another server.

The memory (110) may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory (110) may include a database (112) configured to include information regarding non-destructive estimation of coating layer thickness based on sweep frequency photo acoustic guided wave technique. The memory may comprise information pertaining to input(s)/output(s) of each step performed by the processor(s) of the system 100 and methods of the present disclosure. In an embodiment, the database may be external (not shown) to the system 100 and coupled to the system via the I/O interface.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

The various modules of the system 100 are configured for non-destructive estimation of coating layer thickness based on sweep frequency photo acoustic guided wave technique are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 100 are explained in conjunction with flow diagram of FIG. 2 and FIG. 3. The FIG. 2 and FIG. 3 with reference to FIG. 1A and FIG. 1B, are exemplary flow diagrams illustrating a method 200 and a method 300 for non-destructive estimation of coating layer thickness based on sweep frequency photo acoustic guided wave technique using the system 100 of FIG. 1A and FIG. 1B according to an embodiment of the present disclosure.

The steps of the method of the present disclosure will now be explained with reference to the components of the system 100 of FIG. 1A and FIG. 1B for non-destructive estimation of coating layer thickness based on sweep frequency photo acoustic guided wave technique and the flow diagrams as depicted in FIG. 2 and FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, a plurality of photoacoustic guided waves is generated from a plurality of samples at the sensor module 102. The plurality of photoacoustic guided waves is generated by irradiating the plurality of samples by the intensity modulated Continuous Wave (CW)

laser diode at a pre-defined angle and a pre-defined sweep frequency. The plurality of samples is associated with a known-thickness parameter.

In an embodiment, the plurality of samples comprises of a metal including aluminum, steel, iron, etc., with varied thickness of coating layers.

In an embodiment, the intensity modulated Continuous Wave (CW) laser diode is a CW laser diode with associated intensity modulated at the pre-defined sweep frequency, wherein the pre-defined sweep frequency refers to excitation of the intensity modulated CW laser diode based on the plurality of samples. The pre-defined angle is incidence of the intensity modulated CW laser diode irradiation at an optimal angle of 45 degrees on the plurality of samples.

In a preferred embodiment, the intensity modulated continuous wave (CW) laser diode of wavelength 808 nm is used to irradiate the sample. The in-house developed Laser Driver Module (LDM) is used to modulate the intensity of the laser diode with the pre-defined sweep frequency of 100 kHz to 300 kHz. The sample absorbs the laser radiation and produces acoustic waves which are acquired by the ultrasound sensor kept in contact with the sample via a coupling medium. Subsequently, the acoustic signal from the ultrasound sensor is recorded by a Vector Network Analyzer (VNA, Bode-100) and stored into the memory and processor for further analysis.

Since an acoustic signal is produced due to the laser excitation of each sample, it is conventionally termed as the photoacoustic (PA) signal. Hence the terms "plurality of photoacoustic guided waves" and the "photoacoustic (PA) signal" can be used inter-changeably. Moreover, as the sample under investigation is associated with a known-thickness parameter ranging between 100 um to 2-3 mm, guided photoacoustic waves are sensed from the sample to depict the thickness of the coating layer. For producing the guided PA waves in the sample, the laser is excited obliquely at the pre-defined angle of 45° with respect to the sample's plane.

At step 204 of the method 200, a frequency spectrum is determined in the processor module 104 based on a frequency spectra determination technique. The frequency spectrum is determined for the plurality of photoacoustic guided waves generated from the each of the plurality of samples.

In an embodiment, the frequency spectra determination technique is chosen based on a heuristic technique close to the resonance frequency of the plurality of samples/SUT.

The frequency spectra determination technique for obtaining the frequency spectra from the sample, includes irradiating the sample with the intensity modulated laser diode at a narrow band of frequencies alternatively called as a "sweep frequency". The acoustic signals produced in the sample due to the laser irradiation, exhibit identical frequencies as that of the laser diode excitation sweep frequency. The magnitude of the acoustic signal is maximum at a certain frequency which is approximately the resonance frequency of the sample. The sweep frequency acoustic signal is sensed by the ultrasound sensor and acquired by the Vector Network Analyzer (VNA, Bode-100). In VNA, the magnitude of acoustic signal is plotted at different frequencies, to obtain the required frequency spectra of the sample.

At step 206 of the method 200, a resonance frequency is determined in the processor module 104 from the frequency spectrum, based on a sweep frequency photoacoustic guided wave technique.

In an embodiment, the sweep frequency photo acoustic guided wave technique uses a narrow band of frequencies such that a high frequency noise is reduced, and resonance frequency is acquired with a high signal to noise ratio (SNR).

Based on the sweep frequency photo acoustic guided wave technique the swept frequency intensity modulated CW laser diode is used to irradiate the sample. The sample absorbs the modulated laser radiation and undergoes thermoelastic expansion. While relaxing the sample releases a plurality of acoustic waves of same frequency as that of the excited frequencies. Further, the plurality of acoustic wave traverses show a maximum amplitude near the resonance frequency of the sample. A typical frequency resonance acoustic spectrum is received by the ultrasound sensor and acquired by the Vector Network Analyzer (VNA) for further processing. As the plurality of acoustic waves is generated due to the modulated laser irradiation these waves are called as photoacoustic waves and hence the terms "plurality of photoacoustic guided waves" and the "photoacoustic (PA) signal" are used inter-changeably in the disclosure. Moreover, since the sample thickness is very small, the laser is irradiated at a certain angle to produce guided waves and therefore, "plurality of photoacoustic guided waves" and the "photoacoustic (PA) signal" is also referred to as sweep frequency photoacoustic guided waves.

At step 208 of the method 200, a calibration curve is plotted based on the resonance frequency determined in the processor module 104. The calibration curve associates the resonance frequency of each of the plurality of samples against the known-thickness parameter of each of the plurality of samples.

In order to determine the thickness of the sample under test, calibration is first performed. Five samples with known thickness are taken for analysis and the resonance frequency of each of these thicknesses is obtained. Regression analysis is performed on the resonance frequency vs. thickness curve and the analysis is utilized to build the calibration curve.

The calibration curve is utilized for non-destructive estimation of coating layer thickness of a sample under test (SUT) several steps as illustrated in the flowchart (300) of FIG. 3:

At step 302 of the method 300, a plurality of test photoacoustic guided waves is generated from the sample under test (SUT). The plurality of test photoacoustic guided waves is generated by irradiating the SUT by the intensity modulated Continuous Wave (CW) laser diode at the pre-defined angle and the pre-defined sweep frequency.

In an embodiment, the intensity modulated Continuous Wave (CW) laser diode is a CW laser diode with an intensity modulated at the pre-defined sweep frequency, wherein the pre-defined sweep frequency refers to excitation of the intensity modulated CW laser diode based on the plurality of samples/SUT. The pre-defined angle is incidence of the intensity modulated CW laser diode irradiation at an optimal angle of 45 degrees on the plurality of samples/SUT. In a preferred embodiment, the intensity modulated continuous wave (CW) laser diode of wavelength 808 nm to irradiate the sample. The in-house developed Laser Driver Module (LDM) is used to modulate the intensity of the laser diode with the pre-defined sweep frequency of 100 kHz to 300 kHz. In an embodiment, the plurality of samples comprises of a metal including aluminum, steel, iron, etc., with varied thickness of coating layers. Moreover, the sample under test is associated with a known-thickness parameter ranging between 100 um to 2-3 mm.

At step 304 of the method 300, a test frequency spectrum is determined based on the frequency spectrum determination technique. The plurality of test photoacoustic guided waves is generated from the each of the plurality of SUT.

In an embodiment, the frequency spectra determination technique is chosen based on a heuristic technique close to the resonance frequency of the plurality of samples/SUT.

In an embodiment, the frequency spectra determination technique is chosen based on a heuristic technique close to the resonance frequency of the plurality of samples/SUT.

At step 306 of the method 300, a test resonance frequency is determined from the test frequency spectrum based on the sweep frequency photoacoustic guided wave technique.

In an embodiment, the sweep frequency photo acoustic guided wave technique uses a narrow band of frequencies such that a high frequency noise can be reduced and resonance frequency is acquired with a high signal to noise ratio (SNR). A test frequency spectrum is used for calibration curve preparation, there after the calibration curve with a known resonance frequency is utilized to determine coating thickness.

At step 308 of the method 300, a coating layer thickness is estimated for the SUT using the calibration curve and the test resonance frequency based on a mass-loading effect technique.

In an embodiment, the mass-loading effect technique including a Sauerbrey equation as given below:

$$\Delta m = -(C^* \Delta f)/n \tag{1}$$

where, $\Delta m$ is the mass of the added layer,

C is the mass sensitivity constant, $\Delta f$ is the resonance frequency shift, and n is the number of the odd harmonics.

The thickness of coating layer is obtained by subtracting the thickness of the SUT from the overall thickness of the SUT with coating layer, wherein the SUT is a bare Al/metal sample.

Experiments:

Experiments have been performed for non-destructive estimation of coating layer thickness, wherein in an example scenario—a bare Al sample is placed in the experimental set-up (as shown in FIG. 1A and FIG. 1B) and is irradiated by the intensity modulated laser with a known sweep frequency. The acoustic waves produced in the bare Al sample are acquired by the ultrasound sensor and the frequency spectrum for bare Al sample is stored in the memory of computer through VNA. Further, the bare Al sample is replaced by the Al+Layer 1 sample, wherein the Al+Layer 1 sample is the bare aluminum with first layer of coating of a known thickness. Again for the bare Al sample the experiments are repeated to get the frequency spectra of this sample (Al+Layer1). In the same way experiments are performed to get the frequency spectra of the different samples, wherein the bare aluminum is coated with coating of a known thickness for each experimentation.

Experimented have been conducted for calibrating Aluminum (Al) samples along with their overall thickness known and documented in table. 1 shown below:

TABLE 1

| | Al sample thickness | | |
| Sl. No | Sample | Overall thickness (in μm) | Coating thickness (in μm) |
|---|---|---|---|
| 1 | Bare Al | 400 | 0 |
| 2 | Al + Layer 1 | 450 | 50 |
| 3 | Al + Layer 2 | 480 | 80 |

Figure 4:
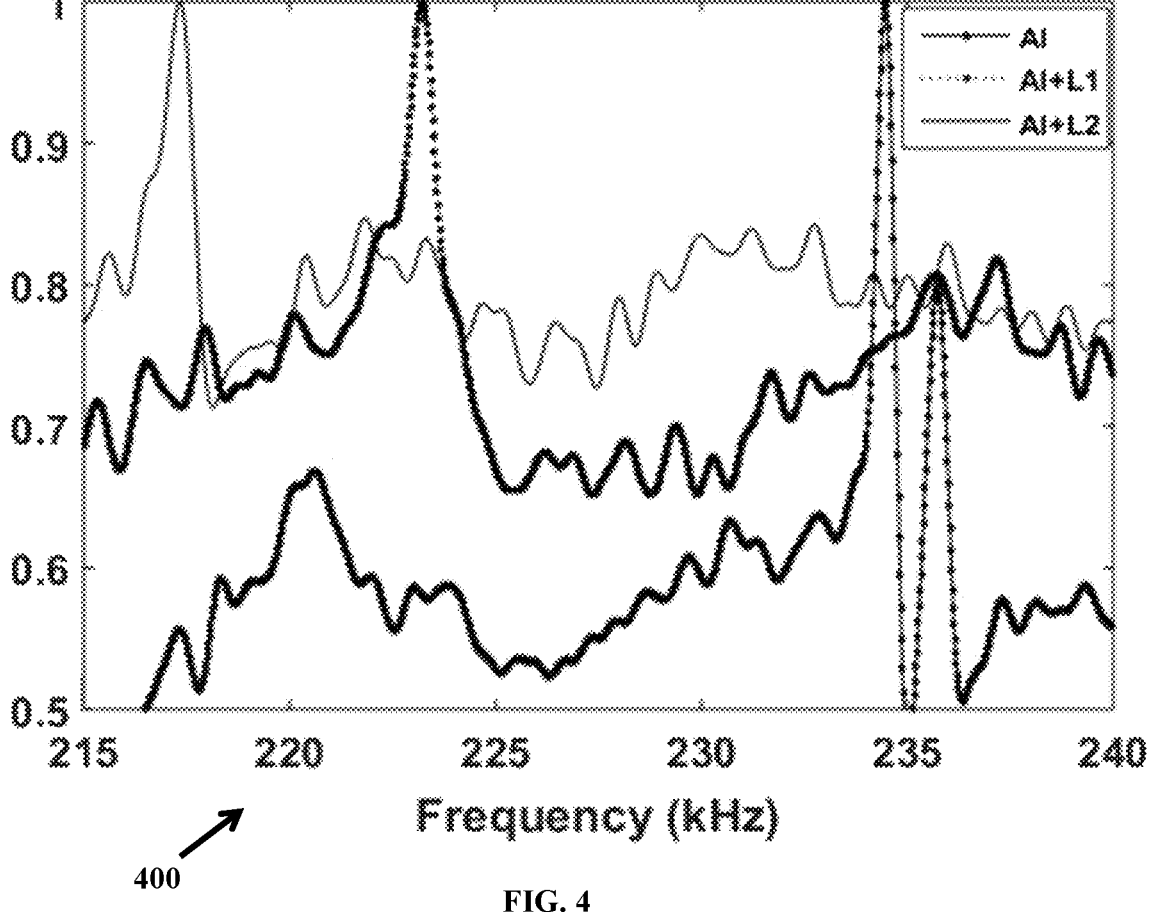
FIG. 4 is a graph illustrating frequency resonance spectra a plurality of samples during non-destructive estimation of coating layer thickness based on sweep frequency photo acoustic guided wave technique in accordance with some embodiments of the present disclosure.
Figure 5:
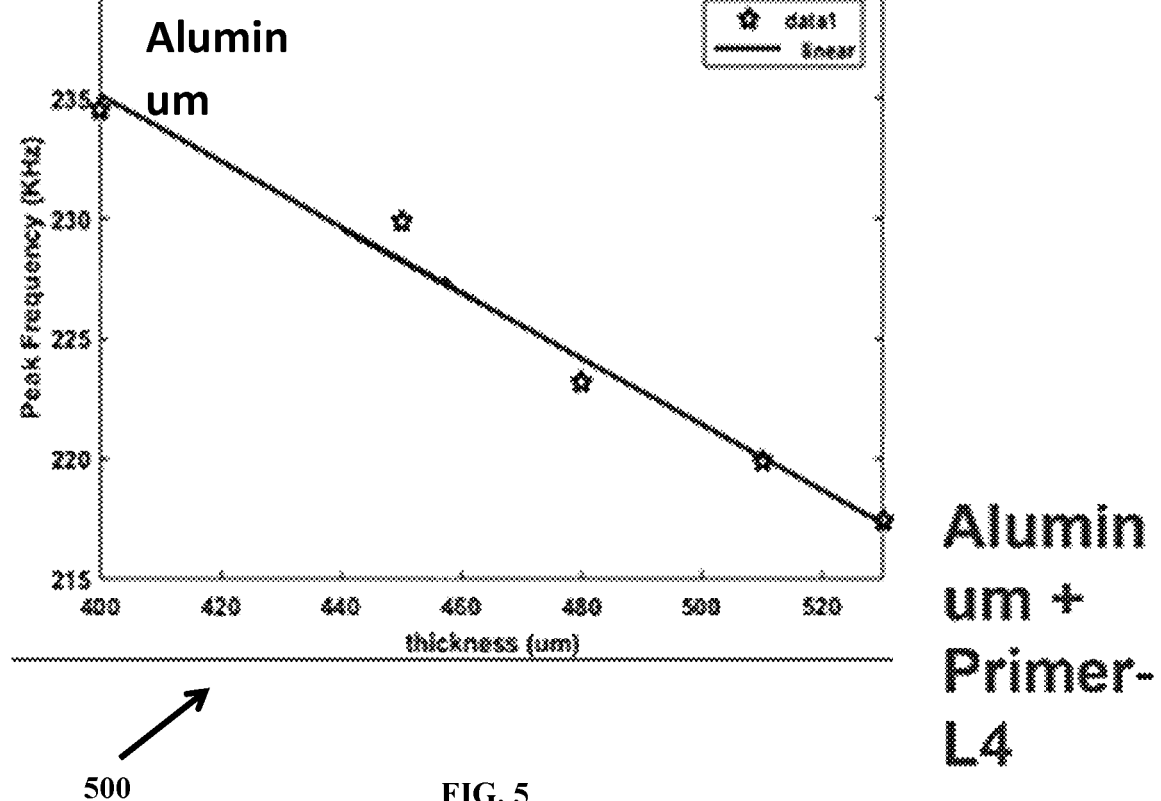
FIG. 5 is an experimental plotting of a calibration curve during non-destructive estimation of coating layer thickness based on sweep frequency photo acoustic guided wave technique in accordance with some embodiments of the present disclosure.
Figure 6:
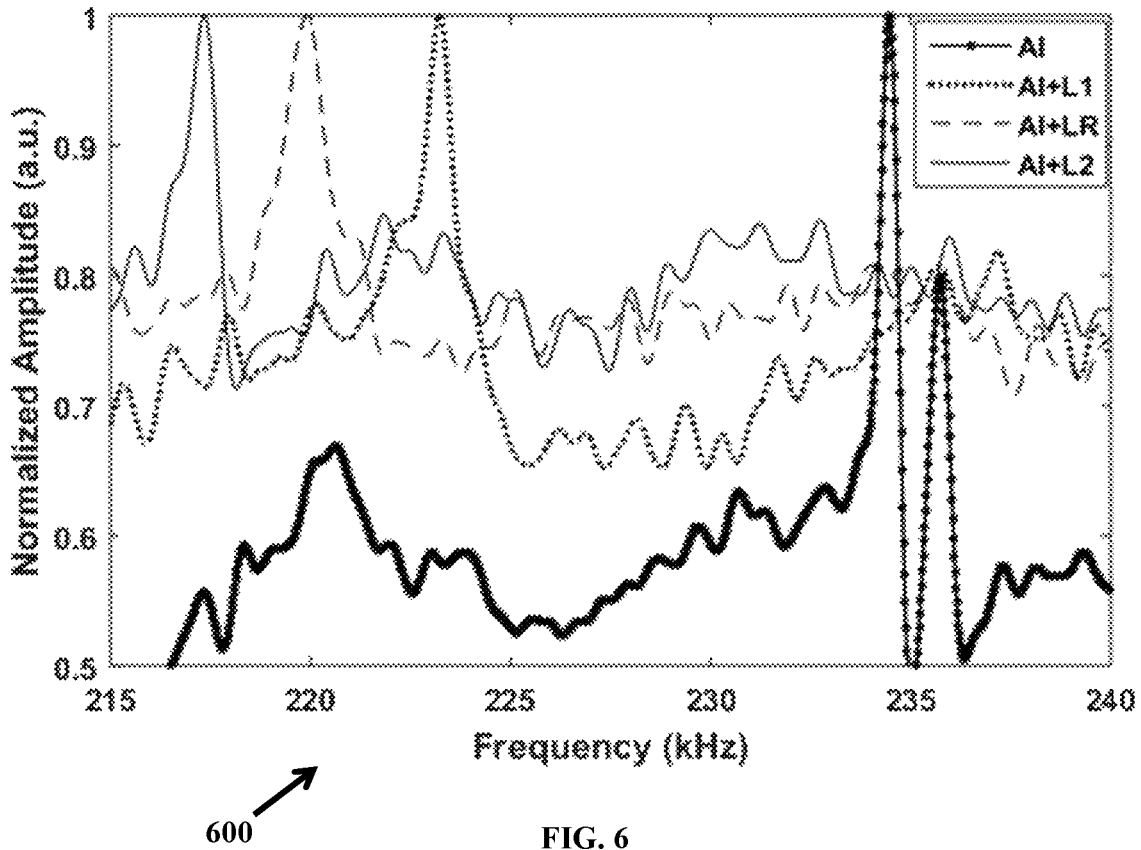
FIG. 6 is a graph illustrating frequency resonance spectra a plurality of samples during non-destructive estimation of coating layer thickness based on sweep frequency photo acoustic guided wave technique in accordance with some embodiments of the present disclosure.

The experiments are performed to obtain the frequency spectra and thereby resonance frequency for each of the samples. as shown in FIG. 4. Further, it can be observed from FIG. 4 that as the thickness of the sample increases the resonance peak shift leftwards or the resonance frequency reduces. FIG. 5 shows that the calibration curve between the resonance frequency and thickness exhibits the inverse relationship when the data points are plotted with the linear fitting.

Figure 7:
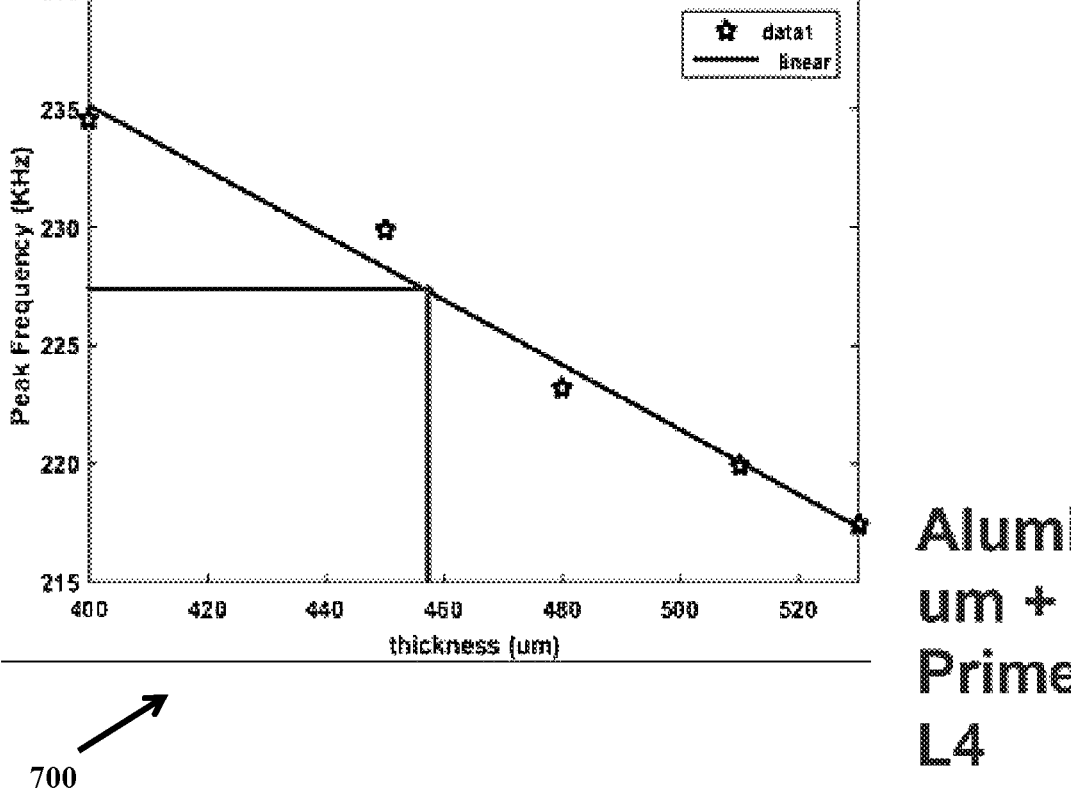
FIG. 7 is non-destructive estimation of coating layer thickness based on sweep frequency photo acoustic guided wave technique using the calibration curve during in accordance with some embodiments of the present disclosure.

Further, an arbitrary coating thickness (LR) is applied to the aluminum substrate. Experiment is performed to get the frequency spectra and thereby resonance frequency for this arbitrary coating thickness aluminum sample. This resonance frequency is used with the calibration curve to estimate the thickness of the arbitrary coating layer as shown in FIG. 7.

The thickness estimated from the calibration curve is obtained as 458 μm which is close to the measured thickness (measured with the standard instrument) which is 460 μm. As shown in the "Coating thickness (in μm)" column of table. 1, the thickness of coating layer is obtained by subtracting the thickness of the bare Al from the overall thickness of the Al with coating layer.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to non-destructive estimation of coating layer thickness based on sweep frequency photo acoustic guided wave technique. Coating of a substrate/surface protects it from wear, corrosion and also serves the cosmetic aspect, hence making coating technology is an essential part industrial process. The existing techniques for coating thickness determination are either destructive or requires a prior knowledge of the refractive index of the surface under investigation or use of sophisticated instrumentation, complicated procedure and harmful radiation during industrial deployment. The disclosure utilizes an intensity modulated Continuous Wave (CW) laser diode to excite a sample thus, making the technique a partially contact based method. Further a calibration curve is plotted by determining a frequency spectrum and resonance frequency. The calibration curve is used for estimation of a coating layer thickness.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including", and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for non-destructive estimation of coating layer thickness based on sweep frequency photo acoustic guided wave technique, comprising:
   generating a plurality of photoacoustic guided waves from a plurality of samples, via one or more hardware processors, by irradiating the plurality of samples by an intensity modulated Continuous Wave (CW) laser diode at a pre-defined angle and a pre-defined sweep frequency, wherein the plurality of samples absorb laser radiation and undergoes thermoelastic expansion and during relaxation the plurality of samples releases the plurality of photoacoustic guided waves having a same frequency as excited frequencies, wherein the plurality of photoacoustic guided waves are received by an ultrasound sensor in contact with the plurality of samples via a coupling medium and then the plurality of photoacoustic guided waves are acquired by a Vector Network Analyzer (VNA), wherein the plurality of photoacoustic guided waves exhibit a maximum amplitude near a resonance frequency of the plurality of samples, and wherein the plurality of samples is associated with a known-thickness parameter;

determining a frequency spectrum of the plurality of photoacoustic guided waves generated from the each of the plurality of samples, via the one or more hardware processors, based on a frequency spectra determination technique;

determining the resonance frequency from the frequency spectrum, via the one or more hardware processors, based on a sweep frequency photoacoustic guided wave technique, wherein the sweep frequency is a narrow band of frequencies, wherein a sweep frequency acoustic signal is sensed by the ultrasound sensor and acquired by the Vector Network Analyzer, wherein the VNA plots a magnitude of the sweep frequency photoacoustic signal at different frequencies to obtain the frequency spectrum from the each of the plurality of samples; and plotting a calibration curve based on the resonance frequency, via the one or more hardware processors, wherein the calibration curve associates the resonance frequency of each of the plurality of samples is associated with the known-thickness parameter of each of the plurality of samples.

2. The processor implemented method of claim 1, wherein the calibration curve is utilized for non-destructive estimation of coating layer thickness of a sample under test (SUT), comprises:

generating a plurality of test photoacoustic guided waves from the sample under test (SUT), via the one or more hardware processors, by irradiating the SUT by the intensity modulated Continuous Wave (CW) laser diode at the pre-defined angle and the pre-defined sweep frequency;

determining a test frequency spectrum of the plurality of test photoacoustic guided waves generated from the each of the plurality of SUT, via the one or more hardware processors, based on the frequency spectrum determination technique;

determining a test resonance frequency from the test frequency spectrum, via the one or more hardware processors, based on the sweep frequency photoacoustic guided wave technique; and estimation a coating layer thickness of the SUT using the calibration curve and the test resonance frequency, via the one or more hardware processors.

3. The processor implemented method of claim 1, wherein the intensity modulated Continuous Wave (CW) laser diode is a CW laser diode with an intensity modulated at the pre-defined sweep frequency, wherein a Laser Driver Module (LDM) is configured to modulate the intensity of the CW laser diode in accordance with the predefined sweep frequency, wherein the pre-defined sweep frequency refers to excitation of the intensity modulated CW laser diode based on one of the plurality of samples and the SUT, wherein the predefined sweep frequency ranges between 100 kHz to 300 kHz.

4. The processor implemented method of claim 1, wherein the pre-defined angle is incidence of the intensity modulated CW laser diode irradiation at an optimal angle of 45 degrees on one of the plurality of samples and the SUT, wherein the intensity modulated CW laser diode is of wavelength 808 nm.

5. The processor implemented method of claim 1, wherein the frequency spectra determination technique is chosen based on a heuristic technique close to the resonance frequency of one of the plurality of samples and the SUT.

6. The processor implemented method of claim 1, wherein the sweep frequency photo acoustic guided wave technique uses a narrow band of frequencies such that a high frequency noise and the resonance frequency is exceeding a threshold of a signal to noise ratio (SNR).

7. A system for non-destructive estimation of coating layer thickness based on sweep frequency photo acoustic guided wave technique, comprising:

a sensor module, and an analysis module comprising a one or more hardware processors(s), an Input/Output interface(s), a memory, and a database, wherein the one or more hardware processors are configured by the instructions to:

generate a plurality of photoacoustic guided waves from a plurality of samples, via one or more hardware processors, by irradiating the plurality of samples by an intensity modulated Continuous Wave (CW) laser diode at a pre-defined angle and a pre-defined sweep frequency, wherein the plurality of samples absorb laser radiation and undergoes thermoelastic expansion and during relaxation the plurality of samples releases the plurality of photoacoustic guided waves having a same frequency as excited frequencies, wherein the plurality of guided photoacoustic waves are received by an ultrasound sensor in contact with the plurality of samples via a coupling medium and then the plurality of photoacoustic guided waves are acquired by a Vector Network Analyzer (VNA), wherein the plurality of photoacoustic guided waves exhibit a maximum amplitude near a resonance frequency of the plurality of samples, and wherein the plurality of samples is associated with a known-thickness parameter;

determine a frequency spectrum of the plurality of photoacoustic guided waves generated from the each of the plurality of samples, via the one or more hardware processors, based on a frequency spectra determination technique;

determine the resonance frequency from the frequency spectrum, via the one or more hardware processors, based on a sweep frequency photoacoustic guided wave technique, wherein the sweep frequency is a narrow band of frequencies, wherein a sweep frequency acoustic signal is sensed by the ultrasound sensor and acquired by the Vector Network Analyzer, wherein the VNA plots a magnitude of the sweep frequency photoacoustic signal at different frequencies to obtain the frequency spectrum from the each of the plurality of samples; and plot a calibration curve based on the resonance frequency, via the one or more hardware processors, wherein the calibration curve associates the resonance frequency of each of the plurality of samples is associated with the known-thickness parameter of each of the plurality of samples.

8. The system of claim 7, wherein the calibration curve is utilized for non-destructive estimation of coating layer thickness of a sample under test (SUT), comprises:

generate a plurality of test photoacoustic guided waves from the sample under test (SUT), via one or more hardware processors, by irradiating the SUT by the intensity modulated Continuous Wave (CW) laser diode at the pre-defined angle and the pre-defined sweep frequency;

determine a test frequency spectrum of the plurality of test photoacoustic guided waves generated from the each of the plurality of SUT, via the one or more hardware processors, based on the frequency spectrum determination technique;

determine a test resonance frequency from the test frequency spectrum, via the one or more hardware processors, based on the sweep frequency photoacoustic guided wave technique; and estimate a coating layer thickness of the SUT using the calibration curve and the test resonance frequency, via the one or more hardware processors.

9. The system of claim 7, wherein the intensity modulated Continuous Wave (CW) laser diode is a CW laser diode with an intensity modulated at the pre-defined sweep frequency, wherein a Laser Driver Module (LDM) is configured to modulate the intensity of the CW laser diode in accordance with the predefined sweep frequency, wherein the pre-defined sweep frequency refers to excitation of the intensity modulated CW laser diode based on one of the plurality of samples and the SUT, wherein the predefined sweep frequency ranges between 100 kHz to 300 kHz.

10. The system of claim 7, wherein the pre-defined angle is incidence of the intensity modulated CW laser diode irradiation at an optimal angle of 45 degrees on one of the plurality of samples and the SUT, wherein the intensity modulated CW laser diode is of wavelength 808 nm.

11. The system of claim 7, wherein the frequency spectra determination technique is chosen based on a heuristic technique close to the resonance frequency of one of the plurality of samples and the SUT.

12. The system of claim 7, wherein the sweep frequency photo acoustic guided wave technique uses a narrow band of frequencies such that a high frequency noise and the resonance frequency is exceeding a threshold of a signal to noise ratio (SNR).

13. One or more non-transitory machine-readable information storage mediums for non-destructive estimation of coating layer thickness based on sweep frequency photo acoustic guided wave technique comprising one or more instructions which when executed by one or more hardware processors cause:

generating a plurality of photoacoustic guided waves from a plurality of samples, by irradiating the plurality of samples by an intensity modulated Continuous Wave (CW) laser diode at a pre-defined angle and a pre-defined sweep frequency, wherein the plurality of samples absorb laser radiation and undergoes thermoelastic expansion and during relaxation the plurality of samples releases the plurality of photoacoustic guided waves having a same frequency as excited frequencies, wherein the plurality of photoacoustic guided waves are received by an ultrasound sensor in contact with the plurality of samples via a coupling medium and then the plurality of photoacoustic guided waves are acquired by a Vector Network Analyzer (VNA), wherein the plurality of photoacoustic guided waves exhibit a maximum amplitude near a resonance frequency of the plurality of samples, and wherein the plurality of samples is associated with a known-thickness parameter;

determining a frequency spectrum of the plurality of photoacoustic guided waves generated from the each of the plurality of samples, based on a frequency spectra determination technique;

determining the resonance frequency from the frequency spectrum, based on a sweep frequency photoacoustic guided wave technique, wherein the sweep frequency is a narrow band of frequencies, wherein a sweep frequency acoustic signal is sensed by the ultrasound sensor and acquired by the Vector Network Analyzer, wherein the VNA plots as magnitude of the sweep frequency photoacoustic signal at different frequencies to obtain the frequency spectrum from each of the plurality of samples; and plotting a calibration curve based on the resonance frequency, wherein the calibration curve associates the resonance frequency of each of the plurality of samples is associated with the known-thickness parameter of each of the plurality of samples.

14. The one or more non-transitory machine-readable information storage mediums of claim 13, wherein the calibration curve is utilized for non-destructive estimation of coating layer thickness of a sample under test (SUT), comprising generating a plurality of test photoacoustic guided waves from the sample under test (SUT, by irradiating the SUT by the intensity modulated Continuous Wave (CW) laser diode at the pre-defined angle and the pre-defined sweep frequency;

determining a test frequency spectrum of the plurality of test photoacoustic guided waves generated from the each of the plurality of SUT, based on the frequency spectrum determination technique;

determining a test resonance frequency from the test frequency spectrum, based on the sweep frequency photoacoustic guided wave technique, wherein the sweep frequency photo acoustic guided wave technique uses a narrow band of frequencies such that a high frequency noise and the resonance frequency is exceeding a threshold of a signal to noise ratio (SNR); and estimation a coating layer thickness of the SUT using the calibration curve and the test resonance frequency.

15. The one or more non-transitory machine-readable information storage mediums of claim 13, wherein the intensity modulated Continuous Wave (CW) laser diode is a CW laser diode with an intensity modulated at the pre-defined sweep frequency, wherein a Laser Driver Module (LDM) is configured to modulate the intensity of the CW laser diode in accordance with the predefined sweep frequency, wherein the pre-defined sweep frequency refers to excitation of the intensity modulated CW laser diode based on one of the plurality of samples and the SUT, wherein the predefined sweep frequency ranges between 100 kHz to 300 kHz, wherein the pre-defined angle is incidence of the intensity modulated CW laser diode irradiation at an optimal angle of 45 degrees on one of the plurality of samples and the SUT, wherein the intensity modulated CW laser diode is of wavelength 808 nm, wherein the frequency spectra determination technique is chosen based on a heuristic technique close to the resonance frequency of one of the plurality of samples and the SUT, and wherein the sweep frequency photo acoustic guided wave technique uses a narrow band of frequencies such that a high frequency noise and the resonance frequency is exceeding a threshold of a signal to noise ratio (SNR).

\* \* \* \* \*